United States Patent [19]
Krogsrud

[11] 3,903,748
[45] Sept. 9, 1975

[54] APPARATUS FOR MOVEMENT OF A CYLINDRICAL BODY IN AXIAL DIRECTION

[75] Inventor: Harald Krogsrud, Gjettum, Norway

[73] Assignee: Elkem-Spigerverket A/S, Oslo, Norway

[22] Filed: Sept. 13, 1973

[21] Appl. No.: 396,893

[30] Foreign Application Priority Data
Sept. 14, 1972 Norway.............................. 3269/72

[52] U.S. Cl. ................................................ 74/25
[51] Int. Cl. .......................................... F16h 21/16
[58] Field of Search..................... 74/25, 459, 424.8

[56] References Cited
UNITED STATES PATENTS

| | | | |
|---|---|---|---|
| 2,511,243 | 6/1950 | Brubaker................. | 74/25 |
| 2,940,322 | 6/1960 | Hhing..................... | 74/25 |
| 2,966,071 | 12/1960 | Wise...................... | 74/459 |
| 2,979,965 | 4/1961 | Diebold.................. | 74/459 |
| 3,101,623 | 8/1963 | Hayes..................... | 74/459 |
| 3,161,073 | 12/1964 | Deutsch et al.......... | 74/459 |
| 3,272,021 | 9/1966 | Weber..................... | 74/25 |
| 3,376,019 | 4/1968 | Weiss...................... | 74/25 |
| 3,424,012 | 1/1969 | Hirmann.................. | 74/25 |
| 3,475,972 | 11/1969 | Steibel.................... | 74/25 |

*Primary Examiner*—Samuel Scott
*Assistant Examiner*—Wesley S. Ratliff, Jr.
*Attorney, Agent, or Firm*—Eyre, Mann & Lucas

[57] ABSTRACT

An apparatus for continuous movement of a cylindrical body in the direction of its axis is disclosed. The apparatus comprises a series of rollers, helically arranged, which are in pressurized contact with the cylindrical body, the pressure being supplied by a resilient member. Rotation of the resilient member by means of an outer rigid shell causes rotation of the rollers which in turn causes movement of the cylinder.

7 Claims, 3 Drawing Figures

APPARATUS FOR MOVEMENT OF A CYLINDRICAL BODY IN AXIAL DIRECTION

The present invention relates to an apparatus for moving cylinders in axial direction. By axial direction is meant movement along the central axis of the longitudinal direction of the cylinder.

The apparatus, while having general application, is of particular interest with respect to the moving of pre-baked electrodes in electric furnaces wherein the apparatus can be used in feeding the electrodes into the electric furnaces with respect to the electrode holder.

The apparatus of the present invention comprises a series of spaced rollers which are arranged in an annular manner about the cylinder to be moved. The rollers are positioned in a helical pattern with respect to the cylinder to be moved and with respect to the outer shell which moves the rollers. The outer shell for driving the rollers comprises a rigid outer member and an interior resilient sleeve. The interior resilient sleeve presses the rollers into firm engagement with the cylinder to be moved. The resilient member may be any desired material which will impart the required force to the rollers to hold the cylinder to keep it from slipping. Besides imparting force to the rollers to hold the cylinder, the resilient sleeve is also advantageous because it allows for minor variations in the surface of the cylinder being moved. The resilient sleeve may be either a continuous member or it may be a series of annular strips. Suitable for use in an electric furnace is a polyurethane sleeve having a Shore D Hardness of about 70.

The outer sleeve is of a rigid material, preferably steel. The resilient member is preferably immovable with respect to the outer sleeve so that when the outer sleeve is driven there is no slipping between the outer sleeve and the resilient member. Depending upon the construction of the outer sleeve and the resilient member, it may be necessary to use adhesive or other attachment means to affix the resilient member to the sleeve but it will be understood that in some cases the two will be immovable with respect to each other simply by frictional engagement. In most cases, the sleeve will be made as a continuous member and the cylindrical body will be introduced into it by rotation of the rollers as hereinafter described. However, if desired, the cylindrical body can be made to open and close as for example by means of a hinged portion and a complementarily positioned attachment means. This structure would be useful for example where only the central portion of the member to be moved up and down is cylindrical.

The rollers which the resilient sleeve engages can be made of any material which will remain essentially cylindrical when the pressure of the resilient member is applied to it and which will operate to move the interior cylinder when the outer sleeve is rotated. For pre-baked electrodes in electric furnaces the rollers are preferably made of steel covered with a rubber sleeve. Of course, the rubber sleeve is essentially immovable with respect to the steel roller.

The rollers are arranged in a helical manner with respect to the axis of the cylinder to be moved. Thus, when the outer sleeve rotates which in turn rotates the rollers, the rollers, since they are travelling in a helical direction, will move the cylinder up or down according to the helical position in which they are arranged. Rotation of the rollers will also tend to cause rotation of the cylinder. Where it is desired that the cylinder not rotate, this can be prevented by having two sets of apparatuses according to the present invention with equal but opposite helical gradients.

These and other features of the present invention may be more fully understood with respect to the following Figs. in which.

Figure 1:
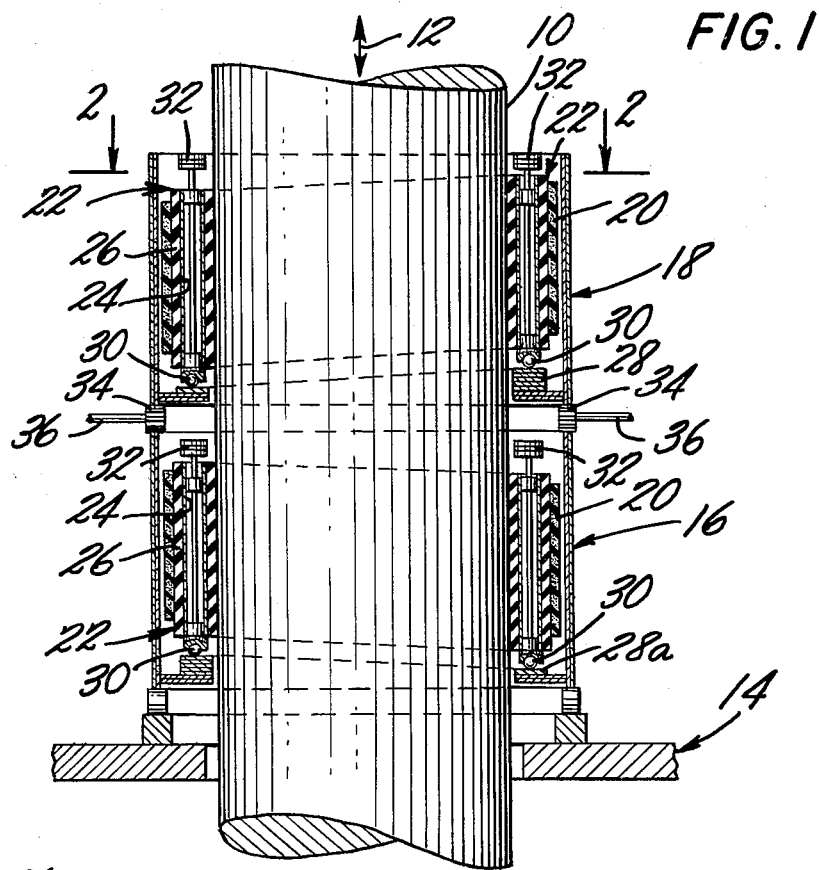
FIG. 1 is a side view partly in cross section of the preferred embodiment of the present invention.
Figure 2:
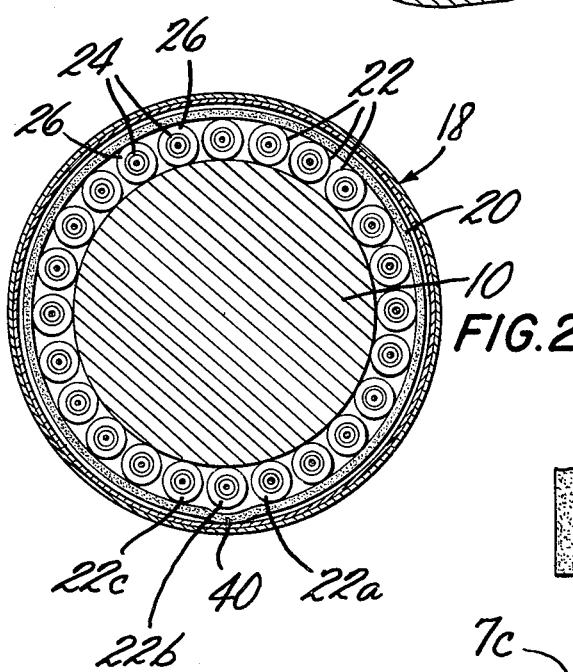
FIG. 2 is a top view of an apparatus according to the present invention.

Referring now to FIG. 1 there is shown a cylinder 10 which is to be moved up and down in axial direction by the apparatus of the present invention as indicated by the arrow 12. A supporting frame 14 is employed for carrying the apparatus of the present invention and maintains the apparatus of the present invention in fixed position relative to the axial movement of the cylinder 10. The supporting frame 14 will normally be movable as for example by a hoist with respect to the entire apparatus (not shown) such as an electrical smelting furnace in which the apparatus of the present invention is being employed. 16 and 18 indicate rigid sleeves of the lower and upper apparatuses of the present invention. Each rigid cylindrical sleeve has located interior thereof a resilient member 20. In juxtaposition to the resilient member 20 are a series of rollers 22 which are spaced apart from each other as can be more clearly seen in FIG. 2. The rollers preferably comprise a steel core 24 and a rubber exterior 26. The rollers 22 rest on a helical plane 28 and are supported for example by ball bearings 30. It will, of course, be understood that other suitable sliding engagement means could be employed. It will similarly be understood that the rollers need not be resting on a helical plane but could rather be suspended from a helical plane positioned above the top of the rollers. Similarly, the rollers could be disposed between two helical planes, one being positioned above the rollers and the other beneath them. Guide members 32 are provided above the rollers which maintain the rollers in spaced relation with respect to each other and with their axes in parallel relationship with the axis of the cylinder 10. The rollers, which are set into the helical position during initial start-up, are maintained in helical position by the weight of the cylinder 10 which has a tendency to pull down on them and bear them against the helical plane 28. Alternatively, additional guide means may be employed for causing the rollers to follow the helical plane. This can be quite desirable where the cylinder 10 is of a comparatively light weight or when the cylinder is not being moved in a vertical direction.

As shown in FIG. 1, there are two apparatuses in accordance with the present invention viz. that having sleeve 16 and that having sleeve 18. The sleeves 16 and 18 are rotated by means of transmission 34 attached to shaft 36. When shaft 36 is rotated, it effects equal but opposite rotation of the members 16 and 18. Since, as indicated in the drawings, upper helical plane 28 is sloped in opposite gradient direction but in equal gradient distance to lower helical plane 28a, the counter-rotation of cylinders 16 and 18 will effect axial movement of the cylinder 10 without effecting rotation of the cylinder. It will be understood that while two sets of apparatuses operating in equal but opposite directions constitute the preferred embodiment of the present invention, the principle of the present invention can be accomplished with but one such apparatus. It will be equally appreciated that greater than two apparatuses according to the present invention can be employed if necessary or desired as for example where a long cylinder is to be moved. Similarly, when two or more of the apparatuses of the present invention are employed, they may be independently controlled if desired rather than tandemly controlled as shown in FIG. 1.

Figure 3:
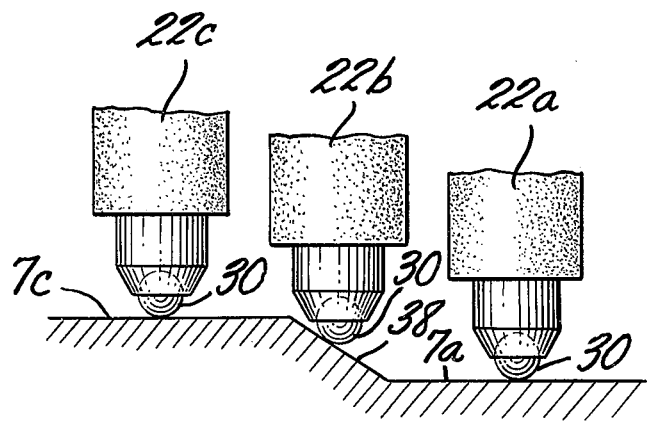
FIG. 3 is a suitable form for connecting the lower and upper ends of a helical channel.

The helical plane must, of course, have a beginning and an end and it is necessary, upon reaching the junction of these two points, to move the rollers 22 from one to the other. For example, if the cylinder is being moved in a downward position, then the rollers will likewise move in a downward position along the helical plane. When the roller has reached the bottom of the helical plane, it is necessary for the roller to return to the top. It has been found that a convenient way to do this is to simply have a steeply inclined (suitably a slope of 30° – 60° with respect to the normal to the axis of the cylinder) return member joining the beginning and end of the helical plane, the steeply inclined return member obviously being of opposite gradient from the gradient of helical plane. A suitable arrangement is shown in FIG. 3 wherein roller 22a is at the bottom 7a of the helical plane, roller 22b is along the steeply inclined return member 38 and roller 22c is at the top 7c of the helical plane. In order to facilitate movement of the roller from the lower part 7a of the helical plane to the upper part 7c of the helical plane, the pressure of the resilient member 20 is preferably released as shown at 40 of FIG. 2.

In operation, rotation of the shaft 36 will cause rotation of the rigid sleeves 16 and 18 through transmission 34. The rotating rigid sleeve, which is relatively fixed with respect to the resilient member 20, will cause rotation of the rollers 22 through the resilient member 20. Since the rollers 22 are moving in a helical path due to helical plane 28 which may for example be a flange connected to the rigid sleeve, the cylinder will move in an up or down direction depending upon rotation of the rigid sleeve. When the rigid sleeve and helical plane have rotated 360°, all the rollers will have moved in a vertical direction a distance equal to half the distance of the total gradient of the helical plane since they will have rolled 180° along the cylinder. Likewise, the cylinder will also have moved a vertical distance equal to one half the total gradient of the helical plane.

It is preferable in accordance with the present invention, especially where the apparatus of the invention is being used to control the axial movement of baked electrodes in electric furnaces, to dimension the roller system and the tension of the resilient member so that the entire weight of the cylinder is borne by the roller apparatus. However, it will be appreciated that there are situations where auxiliary support could be employed so that the apparatus of the present invention is used only for the purpose of effecting movement of the cylinder in axial direction.

It will be understood that the claims are intended to cover all changes and modifications of the preferred embodiments of the invention, herein chosen for the purpose of illustration, which do not constitute departures from the spirit and scope of the invention.

I claim:

1. Apparatus for axial movement of a movable member at least a part of which is essentially cylindrically shaped and having a longitudinal axis comprising:
   a. a rigid annular sleeve to be positioned about said cylindrical shape, said rigid annular sleeve having a longitudinal axis parallel to that of said movable member;
   b. a resilient member interior of said sleeve and relatively immovable with respect to said sleeve;
   c. a plurality of cylindrically shaped rollers interior of and in contact with said resilient member, said rollers being annularly arranged and spaced from each other, and being disposed on and bearing against a path having a helical gradient with respect to the longitudinal axis of said rigid sleeve and being disposed to bear against said cylindrical shape and said rollers each having a longitudinal axis parallel to that of said movable member; and
   d. rotation of the rigid annular sleeve causing rotation of the roller members through the resilient member and movement of the rollers along the path having a helical gradient resulting in movement of the cylindrical member along its longitudinal axis.

2. Apparatus for axial movement of a movable member at least a part of which is essentially cylindrically shaped and having a longitudinal axis comprising:
   a. a rigid annular sleeve to be positioned about said cylindrical shape, said rigid annular sleeve having a longitudinal axis parallel to that of said movable member;
   b. a resilient member interior of said sleeve and relatively immovable with respect to said sleeve;
   c. a plurality of cylindrically shaped rollers interior of and in contact with said resilient member, said rollers being annularly arranged and spaced from each other, and being disposed on and bearing against a path having a helical gradient with respect to the longitudinal axis of said rigid sleeve and being disposed to bear against said cylindrical shape and said rollers each having a longitudinal axis parallel to that of said movable member;
   d. rotation of the rigid annular sleeve causing rotation of the roller members through the resilient member and movement of the rollers along the path having a helical gradient resulting in movement of the cylindrical member along its longitudinal axis;
   e. and said rollers being supported on the helical path by ball bearings.

3. The apparatus of claim 2 wherein the upper and lower ends of the helical path are connected by a steeply inclined return member.

4. Apparatus for axial movement of a movable member at least a part of which is essentially cylindrically shaped and having a longitudinal axis comprising:
   a. a rigid annular sleeve to be positioned about said cylindrical shape, said rigid annular sleeve having a longitudinal axis parallel to that of said movable member;
   b. a resilient member interior of said sleeve and relatively immovable with respect to said sleeve;
   c. a plurality of cylindrically shaped rollers interior of and in contact with said resilient member, said rollers being annularly arranged and spaced from each other, and being disposed on and bearing against a path having a helical gradient with respect to the longitudinal axis of said rigid sleeve and being disposed to bear against said cylindrical shape and said rollers each having a longitudinal axis parallel to that of said movable member;

d. rotation of the rigid annular sleeve causing rotation of the roller members through the resilient member and movement of the rollers along the path having a helical gradient resulting in movement of the cylindrical member along its longitudinal axis;

e. and wherein the upper and lower ends of the helical path are connected by a steeply inclined return member;

f. and wherein the resilient member is not in contact with the rollers in the area of the return member.

5. The apparatus of claim 1 wherein there are both upper and lower helical paths for guiding the rollers.

6. Apparatus for axial movement of a movable member at least a part of which is essentially cylindrically shaped and having a longitudinal axis comprising:

a. a pair of rigid annular sleeves to be positioned about said cylindrical shape, each said rigid annular sleeve having a longitudinal axis parallel to that of said movable member;

b. a resilient member interior of each said sleeve and relatively immovable with respect to each said sleeve;

c. a plurality of cylindrically shaped rollers interior of and in contact with each said resilient member, said rollers each having a longitudinal axis parallel to that of said movable member, said rollers being annularly arranged and spaced from each other and being disposed to bear against said cylindrical shape and the plurality of cylindrically shaped rollers in contact with one said resilient member being disposed on and bearing against a path having a first helical gradient with respect to the longitudinal axis of said rigid sleeve and the plurality of cylindrically shaped rollers in contact with the other said resilient member being disposed on and bearing against a path having a second helical gradient with respect to the longitudinal axis of the said rigid annular sleeve, said second gradient being equal in gradient distance but opposite in gradient direction to said first helical gradient; and d. rotation of the rigid annular sleeves causing rotation of the roller members through the resilient member and movement of the rollers along the paths having helical gradients resulting in movement of the cylindrical member along its longitudinal axis.

7. The apparatus of claim 6 wherein each of the rigid annular sleeves can be operated independently of the other.

* * * * *